Oct. 18, 1927.
P. B. REEVES
1,646,370
CONE PULLEY LUBRICATOR
Filed Sept. 21, 1925
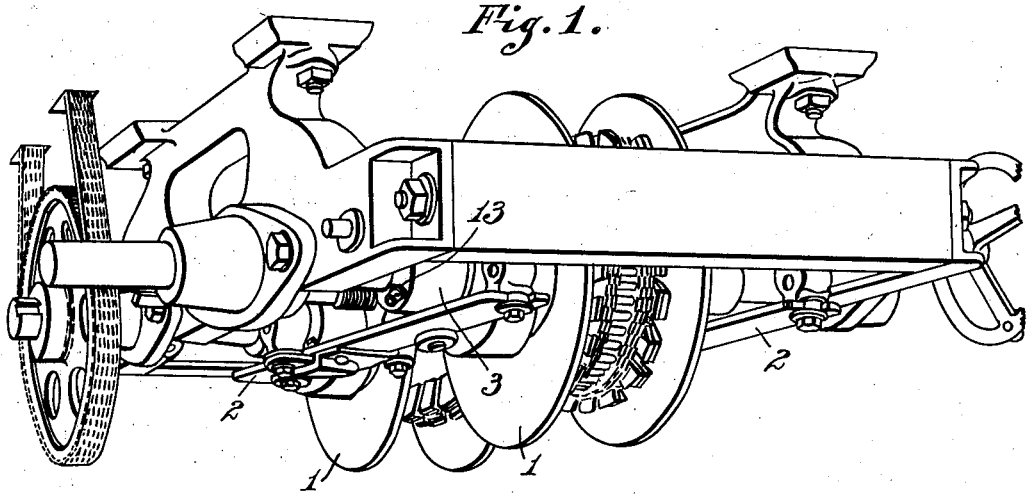
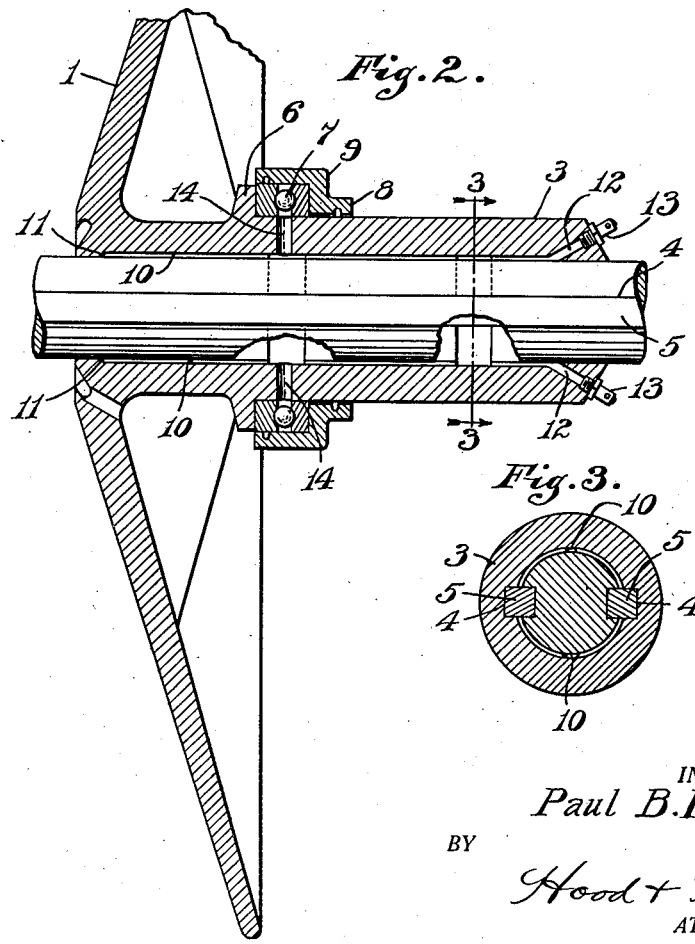
INVENTOR.
Paul B. Reeves,
BY
Hood + Hahn.
ATTORNEYS Patented Oct. 18, 1927.

1,646,370

UNITED STATES PATENT OFFICE.

PAUL B. REEVES, OF COLUMBUS, INDIANA, ASSIGNOR TO REEVES PULLEY COMPANY, OF COLUMBUS, INDIANA, A CORPORATION OF INDIANA.

CONE-PULLEY LUBRICATOR.

Application filed September 21, 1925. Serial No. 57,551.

My invention relates to improvements in the lubrication of members rotatable with and slidably mounted on driving and driven shafts, the hubs of the members, due to their association with other parts, being more or less inaccessible for the ordinary manner of lubrication.

My invention is particularly applicable to the lubrication of the cone discs of the "Reeves" variable speed transmission. This type of transmission is well known in the commercial art.

In the "Reeves" type of variable speed transmission there are two pairs of cone pulleys connected by a belt, which pulleys are splined on rotatable shafts. These pulleys are moved toward and away from one another by suitable mechanism for the purpose of obtaining variations in speed and due to the association of these pulleys with the mechanism the hubs of the pulleys and the shafts on which they are mounted are more or less inaccessible so that it is difficult to properly lubricate the same. My invention provides means whereby the lubrication may be fed to the shafts on which these pulleys are mounted from a point which is accessible to the operator.

For the purpose of disclosing my invention I have illustrated one embodiment thereof in the accompanying drawings in which, Fig. 1 is a perspective view of a "Reeves" variable speed transmission;

Fig. 2 is a sectional view of the manner of mounting one of the cone pulleys, and Fig. 3 is a sectional view on the line 3—3 of Fig. 2.

In the embodiment illustrated the two pairs of cone pulleys 1 are splined upon suitable shafts and the pulleys of each pair are moved toward and away from one another by suitable operating levers 2.

Each of the pulleys 1 is provided with a relatively long hub 3 having keyways 4 through its entire length to coact with the splines 5 on its shaft. The hub is provided externally with an annular shoulder 6 against which the inner race of a ball or roller bearing 7 abuts. Sleeved over the outer end of the hub of the cone and fitting the same with an accurate running fit is a sleeve 8 of a cup 9 within which the bearing 7 is nested and which extends entirely over the bearing so as to form a protection for the bearing and through suitable instrumentalities this sleeve is connected with the operating lever for manipulating the cone pulley. Due to the presence of this sleeve and the other operating lever mechanism the ball bearing 7 is more or less inaccessible for lubricating purposes, and for that matter so is the interior of the hub 3. In order to properly lubricate these parts the hub 3 is provided with a series of axial grooves 10 closed at their forward end as at 11 and terminating in a channel 12 at the rear end of the hub, into which channel is adapted to be fitted a suitable fitting 13 such for instance as one of the alemite type to which may be attached a grease gun. These channels, or grooves 10 communicate with radially disposed channels 14 terminating at the ball bearings 7. Due to the fact that the hub 3 is comparatively long the end of the hub projects well beyond the lever mechanism and is readily accessible so that a grease gun may be attached to the fitting 13 and suitable grease or other lubricating material forced into the channels 10. As these channels are closed at their forward end the pressure on the grease not only forces the grease through the channels 10 but also up through the channels 14 and into the ball bearings 7. These ball bearings being closed by the annular shoulder 6 and the cup 9 the grease is prevented from escaping and the ball bearings are properly lubricated as well as the hub 3 so that the cone pulley will freely slide on its shaft.

I claim as my invention:

1. In a speed varying transmission the combination with belt receiving cone pairs each having an extended hub and shafts upon which said cone pairs are splined, of a thrust sleeve journaled upon each extended hub and having an annular cup, and an antifriction bearing within said cup, and a lever arranged to operate upon said sleeve for moving the cone axially of its shaft, said hub having internal axial lubricant receiving grooves terminating at the end of the hub extension and adjacent the shaft and radial lubricant receiving grooves communicating with said axial grooves and with said antifriction bearing.

2. In a speed varying transmission the combination with belt receiving cone pairs each having an extended hub and shafts upon which said cone pairs are splined, of a thrust sleeve journaled upon each of said hubs having an annular cup, a ball bearing mounted within said cup and an operating lever operating upon said thrust sleeve for moving the cone upon its shaft, said hub having on its interior adjacent the shaft axially extending grease receiving grooves terminating at the end of said hub and radially extending grooves communicating with said axially extending grooves and with said ball bearings, one end of said axial grooves being closed.

In witness whereof, I PAUL B. REEVES have hereunto set my hand at Indianapolis, Indiana.

PAUL B. REEVES.